United States Patent [19]
Erickson

[11] 3,771,005
[45] Nov. 6, 1973

[54] OMNIDIRECTIONAL ULTRAVIOLET RADIATION DETECTOR

[75] Inventor: Clifford W. Erickson, Minnetonka, Minn.

[73] Assignee: Honeywell Inc., Minneapolis, Minn.

[22] Filed: Oct. 12, 1971

[21] Appl. No.: 188,398

[52] U.S. Cl................... 313/101, 313/217, 313/218, 313/224
[51] Int. Cl............................................. H01j 39/06
[58] Field of Search...................... 313/93, 217, 220, 313/101, 218, 224; 250/83.6

[56] References Cited
UNITED STATES PATENTS

| | | | |
|---|---|---|---|
| 3,646,381 | 2/1972 | Panther et al. | 313/93 |
| 3,255,354 | 6/1966 | Cade | 313/93 X |
| 3,022,424 | 2/1962 | Anton | 250/83.6 R |
| 2,925,509 | 2/1960 | Hayes | 313/93 |
| 3,209,197 | 9/1965 | Ahsmann et al. | 313/218 X |

*Primary Examiner*—Palmer C. Demeo
*Attorney*—Lamont B. Koontz et al.

[57] ABSTRACT

An ultraviolet sensitive gaseous discharge detector has essentially uniform angular sensitivity in a plane perpendicular to the axis of the detector tube and in the plane of the detector tube axis. The cathode of the detector is in the form of a thin sputtered layer of metal adhering to the inner wall of the envelope of the detector.

8 Claims, 18 Drawing Figures

PATENTED NOV 6 1973 3,771,005

INVENTOR.
CLIFFORD W. ERICKSON

BY Osmund R. Dahle
ATTORNEY.

COUNTS
PER
MINUTE

COUNTS
PER
MINUTE

INVENTOR.
CLIFFORD W. ERICKSON

BY Omund R. Dahle

ATTORNEY.

3,771,005

OMNIDIRECTIONAL ULTRAVIOLET RADIATION DETECTOR

BACKGROUND OF THE INVENTION

This invention is related to radiation sensitive, gaseous discharge detectors of the Geiger-Mueller type. More particularly, it is concerned with an ultraviolet sensitive detector having omnidirectional sensitivity to ultraviolet radiation.

What is meant by "Geiger-Mueller detector" is a radiation detector having an anode and a cathode disposed in an ionizable gas, and which, upon being subjected to radiation to which it is sensitive, causes an electron to be present within the electric field established by the anode and cathode, whereupon the electron accerlerates toward the anode, ionizing the gas, and causing a glow discharge current to flow, which current must be subsequently quenched by means of a quenching mechanism.

There are many applications in which an ultraviolet sensor having uniform sensitivity over a broad viewing angle is desirable. For instance, fire detection systems requiring broad angle surveillance often utilize several sensors to achieve uniform angular sensitivity. It is highly advantageous to utilize a single sensor rather than several sensors.

SUMMARY OF THE INVENTION

The ultraviolet radiation detector of the present invention exhibits omnidirectional sensitivity to ultraviolet radiation. In addition, the overall sensitivity to ultraviolet radiation is approximately ten times the sensitivity of prior art ultraviolet radiation detectors utilizing different electrode configurations in an envelope of the same size. The radiation detector of the present invention is rugged, has a minimum of parts, and requires a minimum of fabrication steps.

The envelope of the ultraviolet radiation detector of the present invention is transparent and has a substantially circular cross section. Contained within the envelope is an ionizable gaseous filling. A metal anode of substantially circular cross section is coaxially aligned within the envelope and extends through the envelope to provide external electrical contact. The cathode of the detector is in the form of a thin metal layer which adheres to the inner wall of the envelope. The thin layer of metal is sputtered from the anode during the fabrication of the detector. The thin layer has a thickness which is less than the longer of three times the absorption length of a photon of wavelengths between 2,000A. and 3,000A. in the metal and three tmes the tenuation length of a photoelectron in the metal. External electrical contact to the cathode is provided by cathode contact means which extends through the transparent envelope and makes electrical contact with the cathode.

DESCRIPTION OF THE PREFERRED EMBODIMENTS

Figure 1:
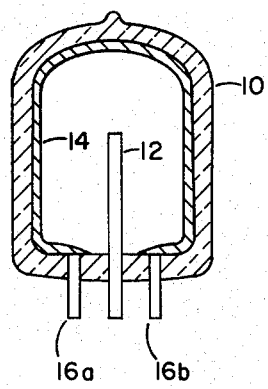
FIG. 1 shows a cross sectional view of an ultraviolet radiation detector of the present invention.

In FIG. 1 is shown a cross sectional view of an ultraviolet radiation detector of the present invention. Transparent envelope 10 has a substantially circular cross section. Contained within envelope 10 is an ionizable gaseous filling which may be, for example, a hydrogen-helium or a hydrogen-neon gas mixture. Coaxially aligned within envelope 10 is metal anode 12 which has a substantially circular cross section. Anode 12 extends through the envelope to provide external electrical contact. Cathode 14 is in the form of a thin layer of metal which adheres to the inner wall of the envelope. As will be described later, the thin layer of metal is formed by sputtering material from anode 12 during one step of the fabrication of the detector. Copper, molybdenum, nickel, and tungsten are four desirable anode and cathode materials. In particular, copper has been found to be the preferred material for the anode and cathode. However, the invention is not limited to these materials.

The thin layer of metal forming cathode 14 must have a thickness which is less than the longer of three times the absorption length of a photon of wavelengths between 2,000A. and 3,000A. in the metal and three times the attenuation length of a photoelectron in the metal. In the preferred embodiment the thin layer has a thickness of between the absorption length and the attenuation length. The sensitivity of the detector is very dependent upon the thickness of the sputtered layer, since too thin a layer does not stop enough radiation and too thick a layer does not permit the photoelectrons to escape into the gaseous filling. When the anode and cathode are copper, the thin layer forming the cathode has a thickness of less than 500A. and in its preferred embodiment has a thickness of between about 50A. and about 200A.

External electrical contact to the cathode is provided by first and second metal pins 16a and 16b which extend into the envelope. The end of each of the metal pins is flush with the inner wall of envelope 10. The fact that pins 16a and 16b are essentially flush with the inner wall of envelope 10 allows them to be sputtered and make contact with the rest of the thin layer forming cathode 14. Although two pins 16a and 16b are shown as forming cathode contact means it is to be understood that a single metal pin may also be used. However, the use of two metal pins provides certain advantages during the fabrication of the detector, as will be described with reference to FIG. 2. In addition, other forms of cathode contact means may be employed. One of these alternative means will be described with reference to FIG. 9.

FIG. 2 describes various steps in the fabrication of the detector shown in FIG. 1. In FIG. 2a, glass bead 20 has been formed on metal pin 16. Glass bead 20 and metal pin 16 are then ground such that one end of metal pin 16 is flush with the ground surface of glass bead 20. A cross sectional view of the resulting structure is shown in FIG. 2b. It should be noted that when two metal pins 16a and 16b are utilized as cathode contact means, the steps described above with reference to FIGS. 2a and 2b are performed twice.

Figure 2A:
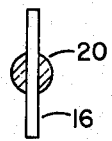
FIGS. 2a through 2g show various steps in the fabrication of the ultraviolet radiation detector of FIG. 1.
Figure 2B:
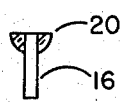
Figure 2C:
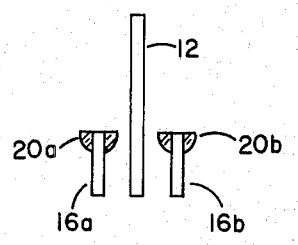
Figure 2D:
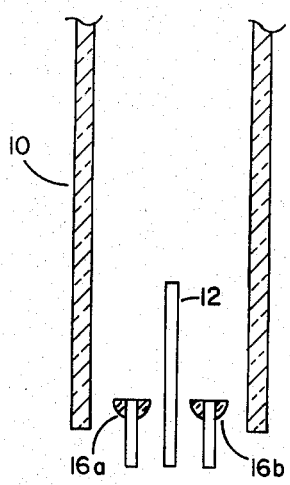

First and second pins 16a and 16b and anode 12 are then aligned in the desired spaced relationship, as shown in FIG. 2c. The spaced relationship of anode 12 and pins 16a and 16b is preferrably maintained by clamping them in a vise or jig. A glass tube which will form envelope 10 is then positioned such that anode 12 and envelope 10 are coaxially aligned. The positioning of the glass tube is shown in FIG. 2d.

Heat is then applied to the glass tube such that first and second pin 16a and 16b and anode 12 are sealed into the glass envelope 10. The sealing of first glass bead 20a and first metal pin 16a as well as second glass bead 20b and second metal pin 16b into the glass envelope is such that the ground surface of the glass bead and the end of the metal pin are flush with the inner wall of glass envelope 10.

Figure 2E:
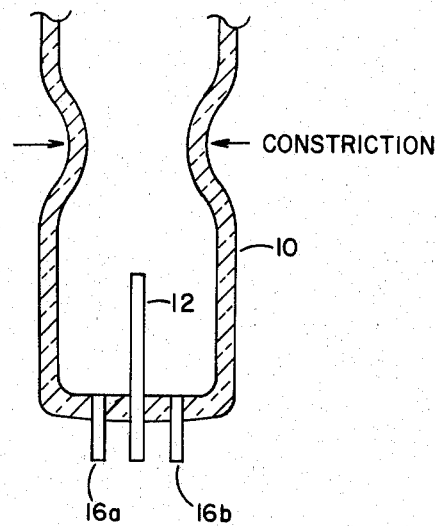
Figure 2F:
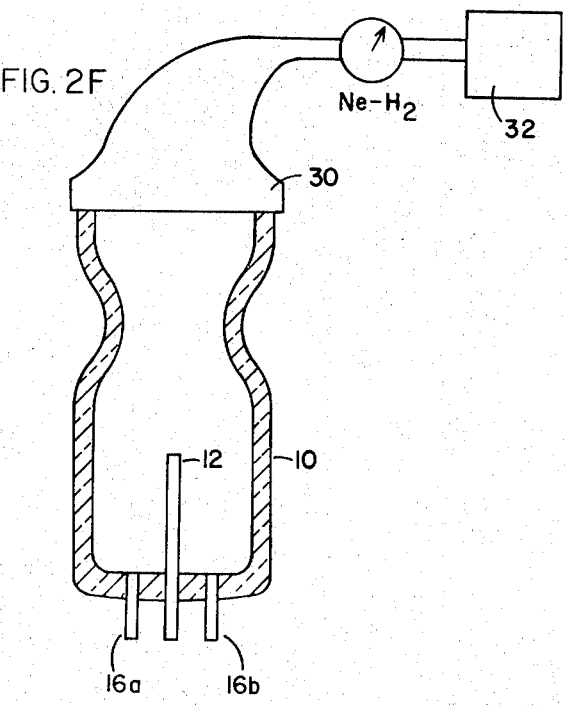

At the same time that the sealing of pin 16a and 16b and anode 12 is performed an additional optional step may be performed. This step involves application of heat to form a constriction in the glass tube. This constriction is shown in FIG. 2e and is desirable since it accurately defines the position at which the tube will eventually be sealed off.

The next step involves filling the envelope with an ionizable gaseous filling such as a neon-hydrogen gas mixture. The gas filling apparatus 30 is sealed to the end of the glass tube. The gas mixture is provided by a gas supply means 32.

Figure 2G:
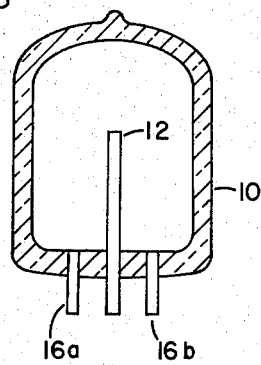

After the tube has been filled with the desired amount of ionizable gas, heat is again applied at the constriction so as to seal the glass envelope with the gaseous filling inside. The resulting structure is shown in FIG. 2g. At this point the detector is essentially complete except for the thin sputtered cathode layer. To achieve sputtering a negative voltage is applied to anode 12 with respect to first and second pins 16a and 16b which is sufficient to cause sputtering of material from anode 12 onto the inner walls of envelope 10. The sputtered material covers pins 16a and 16b thereby providing external electrical contact. The advantage of using two pins 16a and 16b resides in the ability to measure the degree of ohmic contact made by pins 16a and 16b by measuring the resistance between them. When sputtering is completed, the resulting structure is that shown in FIG. 1.

In one successful embodiment of the present invention a copper anode was used. The envelope was filled with a 50 per cent hydrogen and 50 per cent neon gas mixture to a total pressure of 50 torr. A negative voltage was then applied to anode 12 with respect to pins 16a and 16b. A voltage of about 400 volts was sufficient to cause the onset of abnormal glow. The current during sputtering was maintained at a constant value of less than five milliamps.

It is believed that the gas composition and pressure changes during sputtering due to a preferential gettering of hydrogen. This change in composition and pressure is indicated by a drop in breakdown voltage of the tube after sputtering has been performed. For this reason, it is desirable for the fill gas composition prior to sputtering to contain somewhat more hydrogen than is required for the finished tube.

Figure 3:
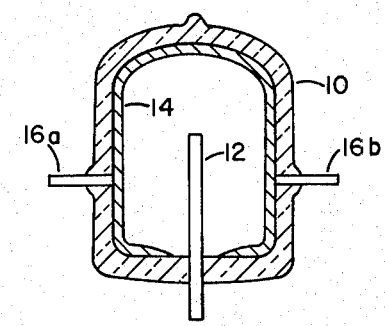
FIG. 3 shows the modified embodiment of the ultraviolet radiation detector of the present invention.

FIG. 3 shows a modified embodiment of the present invention in which pins 16a and 16b are mounted in the sides of envelope 10 rather than in the end of envelope 10 as shown in FIG. 1. It was found that the detector shown in FIG. 3 has slightly superior performance to that shown in FIG. 1. However, the detector shown in FIG. 3 is far more difficult to fabricate.

Figure 4A:
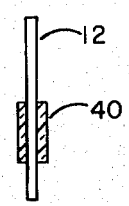
FIG. 4a shows an optional additional step of the fabrication of an ultraviolet radiation detector of the present invention.
Figure 4B:
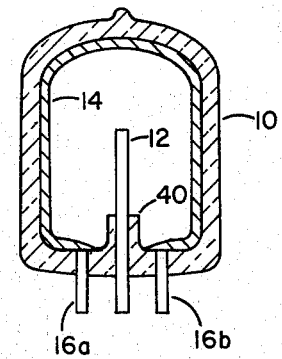
FIG. 4b shows an ultraviolet radiation detector including a glass sleeve formed around the anode and extending into the interior of the detector.

One disadvantage discovered with the detector shown in FIG. 1 is a tendency to "run away". A "run away" tube is one that is characterized by spontaneous discharges in rapid succession even after the ionizing radiation is removed. It was discovered, however, that a slight modification of the detector of FIG. 1 alleviated this difficulty. As shown in FIG. 4a, a glass sleeve 40 is formed around a portion of anode 12 prior to the sealing of anode 12 into the glass envelope. The glass sleeve is then sealed into the glass envelope such that a portion of the sleeve extends into the interior of the detector. The finished detector is shown in FIG. 4b. Glass sleeve 40 greatly reduces the tendency of the detector to "run away".

Figure 5:
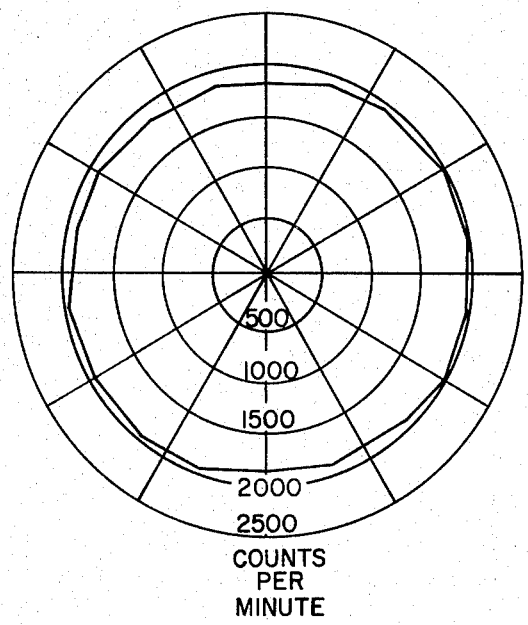
FIG. 5 shows the angular sensitivity of the detector of FIG. 4b in a plane perpendicular to the axis of the detector.

FIG. 5 shows the angular sensitivity of the detector of FIG. 4b in a plane perpendicular to the axis of the tube. As shown in FIG. 5, the angular sensitivity of the detector was measured by using the natural gas flame positioned seven feet from the detector and by having a gas flow of 138 cc per minute. The cathode of the detector was a copper layer having a thickness of approximately 250A. to 325A. and the gas filling prior to sputtering was a 50 per cent hydrogen and 50 per cent neon gas mixture having a pressure 50 torr. The envelope had an outside diameter of about 0.330 inches and a length of about 1 inch. As can be seen, the sensitivity of the tube is essentially identical over the entire 360°. In addition, it has been found that the detector is over ten times as sensitive as detectors having the size envelope but a different, prior art electrode configuration. The increased sensitivity of the detector of the present invention can be explained by the fact that the sensitivity of a detector is proportional to the cathode area, provided that the incident radiation is not focused onto a particular point. With the present invention the area of the cathode is maximized for a given envelope size since the cathode consists of a thin coating on the inner wall of the envelope.

Figure 6:
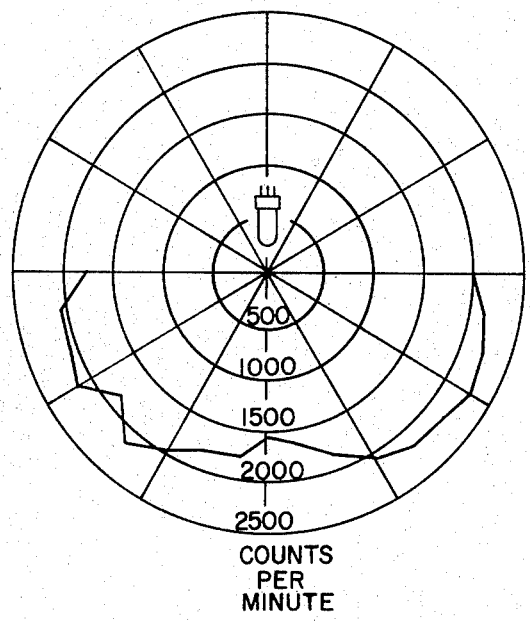
FIG. 6 shows the angular sensitivity of the detector of FIG. 4b in the plane of the detector axis.

FIG. 6 shows the angular sensitivity of the detector in the plane of the tube axis. This plane is perpendicular to the plane of measurement described with reference to FIG. 5. The sensitivity of the detector was measured under conditions identical to those described with reference to FIG. 5. As can be seen from FIG. 6, the angular sensitivity of the detector in the plane of the tube axis is also essentially uniform, thereby indicating that the detector of the present invention is truly omnidirectional in sensitivity.

As has been described previously, the thickness of the thin layer of metal forming cathode 14 must be within a critical range of thicknesses. This critical range is related to the absorption length of a photon of wavelengths between 2,000A. and 3,000A. in the metal and to the attenuation of a photoelectron in the metal. To better understand the dependence of sensitivity of the detector upon cathode thickness, it is necessary to investigate the theory of operation of the detector of the present invention.

Figure 7:
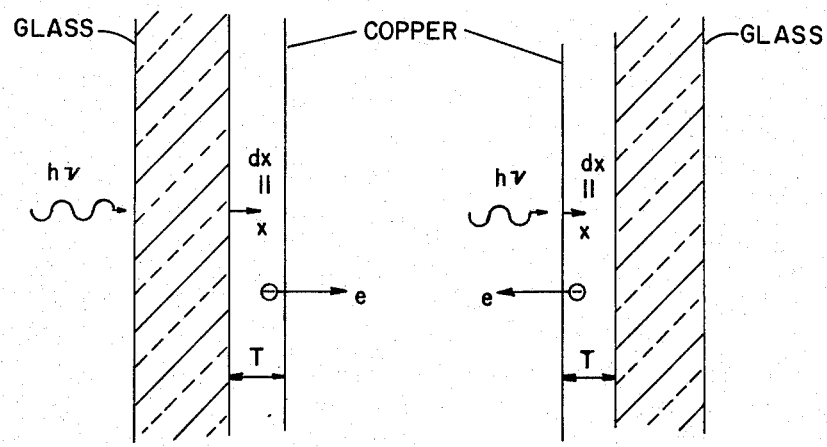
FIG. 7 shows a theoretical approximation of the thin cathode layer as two parallel electrodes.

The escape probability of a photoelectron excited at a distance $x$ from the surface is $P(x) = p_o e^{-x/L}$ where $L$ is the attenuation length and $p_o$ is a constant for a given photon energy. For this discussion, it is possible to approximate the cylindrical tube by two parallel electrodes, as indicated in FIG. 7. The first electrode (the front half of the tube) is a "back-illuminated" cathode (the electrons emerge from the side opposite the entering photons), while the second electrode (back half of the tube) is a "front-illuminated" cathode (electrons emerge from the side at which the photons enter). The front half is considered first. In an incremental thickness $dx$ at $x$ the number of photoelectrons, or "hot electrons"created is just the number of photons being absorbed there, i.e., $I_o \alpha e^{-\alpha x} dx$, where $I_o$ is the initial photon flux and $\alpha$ is the absorption coefficient of the cathode material. The probability of an electron reaching the opposite side is just $p_o e^{-(T-x)/L}$, so that the number of electrons reaching the opposite side is $$p_o I_o \alpha \int_0^T e^{-\alpha x} e^{-(T-x)/L} dx = \frac{\alpha p_o I_o}{\alpha - 1/L} e^{-T/L} - e^{-\alpha T}$$

The back half of the cathode is treated in a similar fashion except that the incident intensity is now $I_o e^{-\alpha T}$ since it has already passed through the first half, and the probability of the electron reaching the surface is $p_o e^{-x/L}$, since it must retrace the path of the photon. The resulting integral is $$p_o I_o \alpha e^{-\alpha T} \int_0^T e^{-\alpha x} e^{-x/L} dx.$$

This process actually occurs repeatedly on each side because of the reflection which occurs (about 35 percent). The above integral is then multiplied by $1/1-R$ where R is the reflection coefficient, to give
$(p_o I_o \alpha)/(\alpha + 1/L) [e^{-\alpha T} - e^{T(-2\alpha - 1/L)}](1/1-R)$
Thus, the total yield Y is $$Y = \alpha p_o I_o \left\{ \frac{1}{1-R} \frac{1}{\alpha + 1/L} (e^{-\alpha T} - e^{-(2\alpha + 1/L)T}) + \frac{1}{\alpha - 1/L} (e^{-T/L} - e^{-\alpha T}) \right\}.$$

Figure 8:
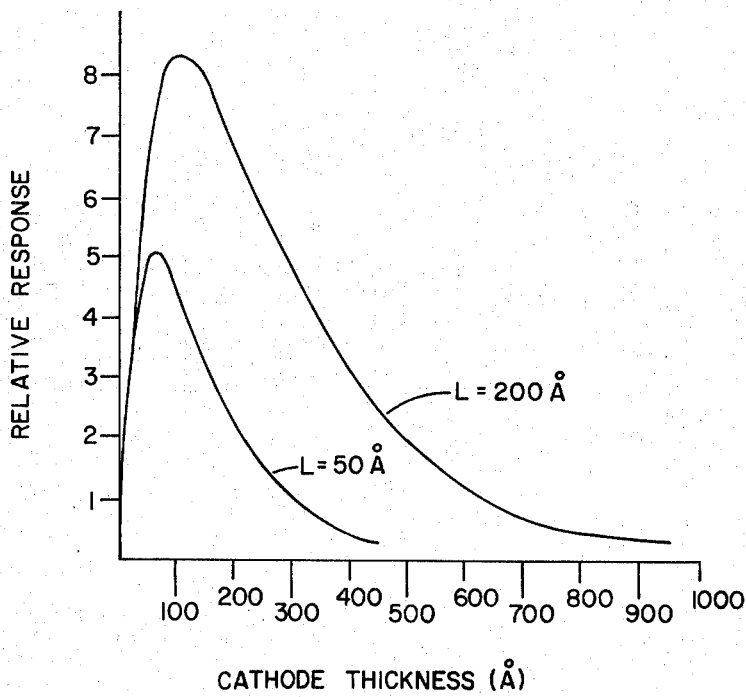
FIG. 8 shows theoretical relative sensitivity of the ultraviolet radiation detector of the present invention as a function of cathode thickness for a copper cathode.

In FIG. 8 the theoretical relative sensitivity of a detector of the present invention as a function of cathode thickness is shown when the cathode metal is copper. The value of $\alpha = 9 \times 10^5$ cm$^{-1}$ was used for the theoretical calculation. This value was reported by Ehrenreich and Philip in Phys. Rev. 122, 1622, (1962), and is valid for wavelengths of radiation between 2,000A. and 2,500A. The value of L, the attenuation length of photoelectron in copper, is not well known; however, a range of 50A. to 200A. has been reported by Crowell et al., in Phys. Rev., 127, 2006, (1962). In FIG. 8 the sensitivity is shown for the values of L of 50A. and 200A. It is believed that the value of L for copper is closer to the 50A. value since the attenuation length of other metals drops rapidly to this value at energies above four electron volts.

It can be seen from FIG. 8 that when the cathode is a copper layer, the thickness is preferably less than 500A. In particular, higher sensitivity is obtained when the cathode has a thickness of between about 50A. and about 200A.

Figure 9A:
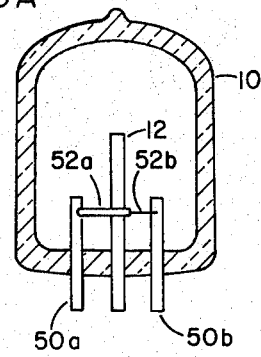
FIGS. 9a through 9c show an alternative method for providing external electrical contact to the cathode.
Figure 9B:
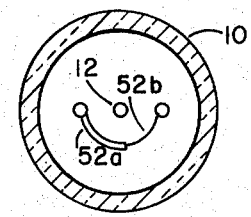

FIG. 9 shows an alternative method for forming the cathode contact means. FIG. 9a shows a cross sectional side view of the tube prior to sputtering. Two pins 50a and 50b extend into the envelope and are connected electrically by a springloaded fine wire 52, which is composed of two wires 52a and 52b of different sizes which are spotwelded together. FIG. 9b shows a top cross sectional view of the tube shown in FIG. 9a.

Figure 9C:
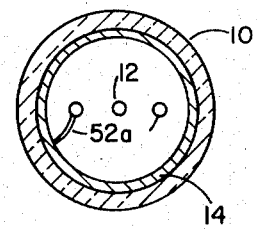

The sputtering process is performed with a negative voltage being applied to anode 12 with respect to first and second pins 50a and 50b. Following the sputtering process, a current is passed between pins 50a and 50b until the smaller wire 52b melts. The larger wire 52a is forced by spring tension against the newly sputtered surface thereby establishing ohmic contact. FIG. 9c shows a top cross sectional view of the completed detector.

It is to be understood that this invention has been disclosed with reference to a series of preferred embodiments and it is possible to make changes in form and detail without departing from the spirit and scope of the invention.

The embodiments of the invention in which an exclusive property or right is claimed are defined as follows.

1. An ultraviolet radiation detector of the photoelectron triggered gaseous discharge type for detecting ultraviolet radiation of wavelengths between about 2,000 A. and about 3,000 A., the ultraviolet radiation detector comprising:

a gas tight transparent envelope,
a photoemissive cathode in the form of a thin layer of metal covering a substantial portion of the inner wall of the envelope, the metal being capable of absorbing ultraviolet radiation and emitting photoelectrons, the thin layer having a thickness which is less than three times the longer of the absorption length of a photon of wavelength between 2,000 A. and 3,000 A. in the metal and the attenuation length of the photoelectron in the metal,
cathode contact means extending through the transparent envelope and making electrical contact with the cathode, thereby providing external electrical contact to the cathode,
a metal anode coaxially aligned with the envelope and extending through the envelope to provide external electrical contact, the metal anode being spaced from the cathode, and
an ionizable gaseous filling contained in the envelope.

2. The ultraviolet radiation detector of claim 1 wherein the thin layer forming the cathode has a thickness of between the absorption of a photon of wavelength between 2,000 A. and 3,000 A. in the metal and the attenuation length of a photoelectron in the metal.

3. The ultraviolet radiation detector of claim 1 wherein the thin layer forming the cathode is copper of thickness less than 500 A.

4. The ultraviolet radiation detector of claim 3 wherein the thin layer forming the cathode has a thickness of between about 50 A and about 200 A.

5. The ultraviolet radiation detector of claim 1 wherein the cathode contact means comprises a first metal pin extending into the envelope, the end of the first metal pin being flush with the inner wall of the envelope.

6. The ultraviolet radiation detector of claim 5 wherein the cathode contact means further comprises a second metal pin extending into the envelope, the end of the second metal pin being flush with the inner wall of the envelope.

7. The ultraviolet radiation detector of claim 1 wherein the ionizable gaseous filling comprises a hydrogen and neon gas mixture.

8. The ultraviolet radiation detector of claim 1 wherein the thin layer forming the cathode comprises metal sputtered from the metal anode.

* * * * *